United States Patent
Lysfjord et al.

[11] Patent Number: 5,876,123
[45] Date of Patent: Mar. 2, 1999

[54] CLEANABLE ACTUATOR

[75] Inventors: John Peter Lysfjord, Minnetonka; Alan Stewart Peterson, Minneapolis; Paul Allan Gangl, Roseville, all of Minn.

[73] Assignee: TL Systems Bosch Group, Brooklyn Park, Minn.

[21] Appl. No.: 958,810

[22] Filed: Oct. 28, 1997

[51] Int. Cl.[6] .................................................. F16C 29/02
[52] U.S. Cl. ............................ 384/41; 384/42; 384/295
[58] Field of Search ............................. 384/41, 42, 295, 384/296; 604/610, 167; 433/80

[56] References Cited

U.S. PATENT DOCUMENTS

| | | | |
|---|---|---|---|
| 4,975,054 | 12/1990 | Esrock | 433/80 |
| 5,006,114 | 4/1991 | Rogers et al. | 604/167 |
| 5,197,954 | 3/1993 | Cameron | 604/110 |

*Primary Examiner*—Lenard A. Footland
*Attorney, Agent, or Firm*—Merchant, Gould, Smith, Edell, Welter & Schmidt, P.A.

[57] ABSTRACT

A guide bearing assembly is disclosed which is capable of being thoroughly cleaned. A linear actuating embodiment includes a reciprocating shaft with first and second spools axially spaced a predetermined distance. Each spool has an associated guide bearing surface taking the form of a cylindrical bore, with the bores axially spaced a distance greater than the axial distance between spools so that when one spool is in engagement with its guide bore, the opposite spool is out of engagement with its guide bore. A rotary bearing embodiment includes a rotatable shaft having first and second spools with each spool having a plurality of angularly spaced lobes. The lobes cooperate with complementing guide bearing surfaces on a guide sleeve. The lobes of one spool are angularly spaced relative to the lobes of a second spool, so that with the lobes of the first spool in engagement with their guide surfaces, the lobes of the second spool are disengaged, and vice versa.

10 Claims, 3 Drawing Sheets

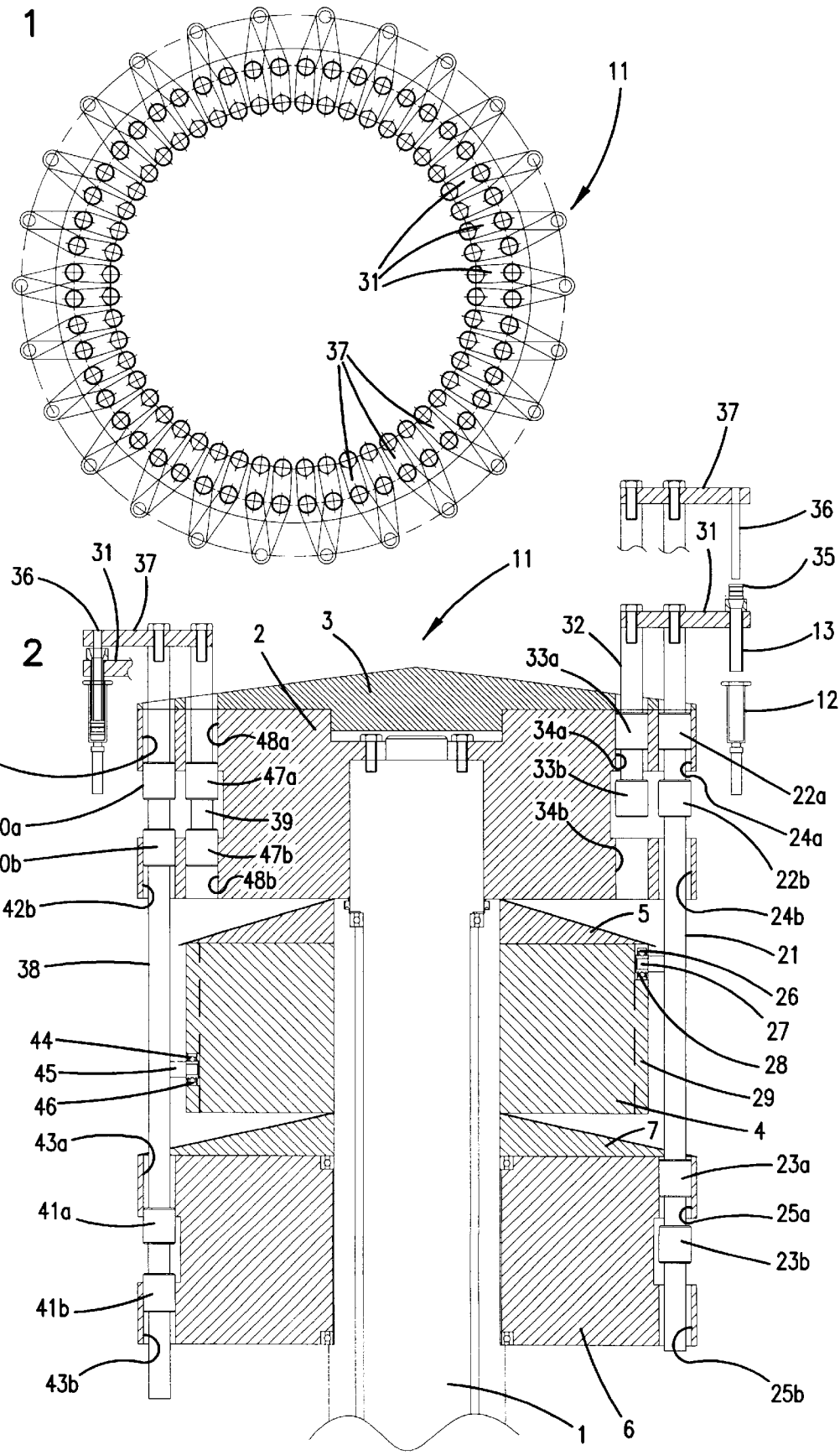

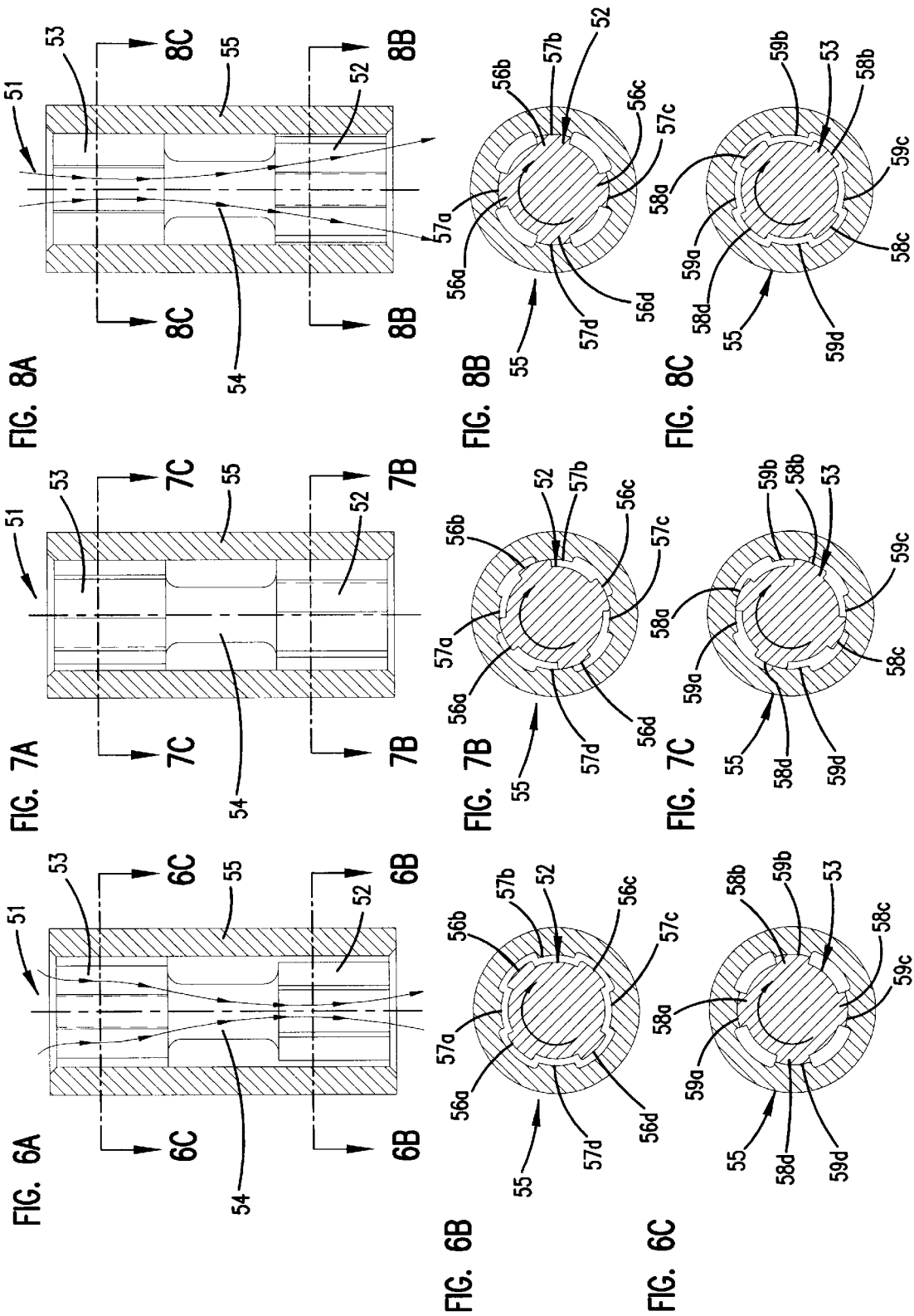

CLEANABLE ACTUATOR

BACKGROUND OF THE INVENTION

The invention relates to guide bearings that are suited for use with machinery that operates in whole or in part in a clean environment, and which may be thoroughly cleaned and decontaminated or sterilized prior to and after use.

Such machinery may, for example, be used for processing pharmaceutical components (e.g., vials, ampules or syringes) or in connection with food processing. Machinery of this type necessarily operates in a clean environment, either by placing the entirety of the machine in a clean room or by defining a clean or isolation zone within the machine itself in which the processing operations take place.

In either case, the various processing operations are typically accomplished through the use of mechanical apparatus that includes both stationary and moving components. To ensure that the processing operation is free from contaminants, it is essential that all surfaces of the apparatus within the clean zone, both stationary and moving, are cleaned and decontaminated or sterilized before the operation begins.

The use of a clean zone forming part of the machinery and which houses only the processing operations greatly reduces the difficulty of cleaning the entire machine. Nevertheless, all of the mechanisms within the clean zone must be decontaminated periodically, and difficulties arise particularly with regard to movable mechanical components that serve a processing function.

For example, certain operations within the clean zone may require linear reciprocating actuators which are guided by some type of bearing. Conventional guide bearings must be enclosed, at least in part, which makes them difficult to clean and therefore vulnerable to the collection of contaminants. This problem is conventionally dealt with by a seal such as a rubber bellows or boot that is connected between the reciprocating actuator and the bearing housing. While such devices serve well in shielding from contaminants, they are difficult to clean and also subject to wear over time. If the bellows or boot fails, the clean zone is immediately subject to contamination, and the processing line must be shut down while the seal is replaced. The same problems occur with rotary actuators.

The subject invention is the result of an endeavor to develop linear and rotary guide bearings usable within the clean zone of a processing machine which not only provide the intended guiding function but which are also easily cleanable in their entirety. The inventive bearings of the preferred embodiment are disclosed in conjunction with a machine that performs one step in a hypodermic syringe filling operation, but the inventive principle itself has wider application.

For linear actuators, the inventive bearing of the preferred embodiment specifically takes the form of a pair of spool members carried on a reciprocating shaft that are axially spaced by a predetermined distance. Each of the spools has an associated guide bearing surface, which in the preferred embodiment takes the form of a cylindrical bore formed in a member which is stationary in relation to the movable spool. The cylindrical bores are also axially spaced but by an amount that is greater than the axial spacing between the two spool members.

This relative axial spacing is chosen so that both spool members may be in partial guided engagement with the associated guide bearing surfaces with the actuator shaft in an intermediate position, but when the shaft is in either of its extreme positions, one spool member is in complete engagement with its associated guide bearing surface while the other spool member is moved entirely out of engagement with its associated guide surface. In the opposite extreme position, the spool members are conversely positioned.

This component arrangement ensures that the linearly moving actuator shaft is always in guided engagement by one or both spool members, thus providing the necessary guiding function. However, it will also be appreciated that the spool which is in the free position and its associated guide bearing surface may be cleaned and decontaminated or sterilized in their entirety with a disinfecting solution or sterilizing agent, and with the actuator shaft moved to its opposite limit position, the other spool member and its associated guide bearing surface may be cleaned and decontaminated or sterilized in the same manner.

The inventive principle also is applicable to rotary guide bearings. The preferred embodiment of this device takes the form of a rotatable shaft disposed within a guide housing. The shaft includes first and second spools, with each spool defining at least two radially outwardly projecting lobes (four equiangularly spaced lobes in the preferred embodiment). The guide housing includes a like number of radially inwardly projecting guide surfaces. With the lobes in guided contact with the associated guide bearing surfaces, fluid communication (e.g., passages for disinfecting liquid or a sterilizing agent) exists only through spaces between the lobes. However, when the shaft is rotated and the lobes are out of guided engagement with the associated guide bearing surfaces, all surfaces of both the spool and the guide housing are exposed for cleaning and decontamination. The second spool is axially spaced from the first spool and has the same structural configuration. However, its lobes are angularly disposed in a staggered arrangement relative to the lobes of the first spool; e.g., the four lobes of one spool are disposed at a relative angular difference of 45° to the other. Stated otherwise, when the lobes of the first spool are in full engagement with the associated guide surfaces, the lobes of the second spool have moved entirely out of engagement with their associated guide bearing surfaces.

From the standpoint of cleaning and decontamination, the rotary bearing operates in the same manner as the reciprocating bearing. In other words, the "free" spool and its associated guide bearing surfaces may be cleaned and decontaminated or sterilized with the shaft in the first position, and when the shaft is rotated to a second position (e.g., 45° for four-lobed spools), the other spool may be cleaned and decontaminated or sterilized in its entirety.

The inventive guide bearings are simple in construction, but provide the necessary guiding function throughout all phases of operation. Most importantly, they are capable of being cleaned and decontaminated in their entirety by moving the actuator from one limit position to the other during the cleaning process.

The invention will be more fully appreciated from the following specification and drawings.

BRIEF DESCRIPTION OF THE DRAWINGS

FIG. 1 is a top plan view of a portion of a rotary machine module used in connection with assembling hypodermic syringes;

FIG. 2 is a transverse cross-sectional view of the rotary machine in side elevation;

FIG. 6A is a longitudinal sectional view of an alternative embodiment of the invention in which the actuating shaft is rotated rather than reciprocated;

FIG. 6B is a transverse sectional view taken along the line 6B—6B of FIG. 6A;

FIG. 6C is a transverse sectional view taken along the line 6C—6C of FIG. 6A;

FIG. 7A is a longitudinal sectional view of the rotatable actuator of FIG. 6A in an intermediate position;

FIG. 7B is a transverse sectional view taken along the line 7B—7B of FIG. 7A;

FIG. 7C is a transverse sectional view taken along the line 7C—7C of FIG. 7A;

FIG. 8A is a longitudinal sectional view of the actuator of FIG. 6A in the second rotatable position;

FIG. 8B is a transverse sectional view taken along the line 8B—8B of FIG. 8A; and FIG. 8C is a transverse sectional view taken along the line 8C—8C of FIG. A.

DETAILED DESCRIPTION OF THE PREFERRED EMBODIMENTS

Figure 3:
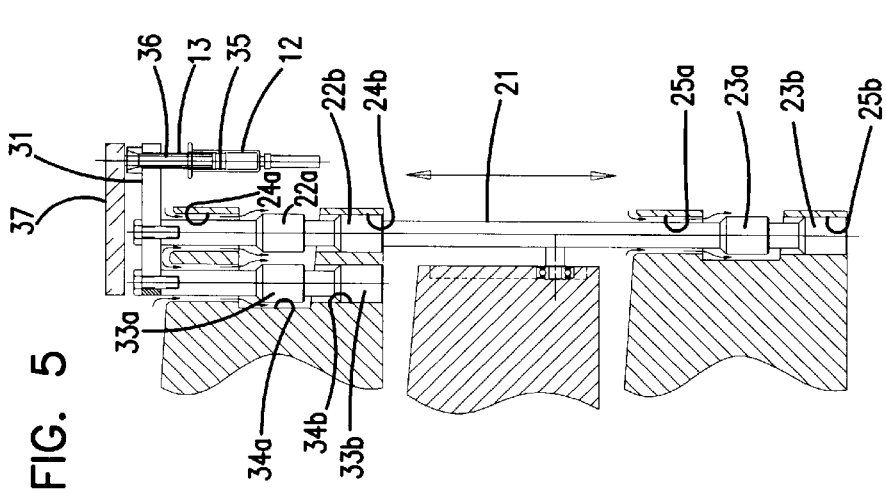
FIG. 3 is a fragmentary sectional view similar to FIG. 2 with an actuator in a first extended position.

With initial reference to FIGS. 1 and 2, a machine module bearing the general reference numeral 11 is constructed to perform one step in the process of assembling hypodermic syringes 12. Machine 11 is of the rotary type, and its specific function is to insert a resilient plunger into the barrel or reservoir of the syringe 12 which has already been filled with liquid. The syringes 12 are conventionally carried to the rotary machine 11 by a transport system (not shown) which brings each syringe 12 to an initial position (see the right-hand side of FIG. 2). The syringe 12 then moves in a rotary motion with machine 11 until the plunger has been inserted (see the left-hand side of FIG. 2), after which it leaves machine 11 and is transported for further processing. It is to be understood that the entire process takes place within a clean, decontaminated room, or within an isolated space within the machine which is clean and decontaminated or sterilized.

Rotary machine 11 includes a large, vertically disposed rotating primary shaft 1, driven by means not shown, and on which is mounted a rotating top cylindrical head 2 having a conical cap 3, a stationary middle cylindrical cam actuating section 4 having a cap 5 and a rotating lower cylindrical section 6 having a cap 7. The caps 3, 5, 7 cause cleaning agents to flow downward into a system drain (not shown) and prevent the accumulation of contaminants in pooled liquids. The entirety of rotary machine 11 as shown in FIG. 2 is disposed in a clean zone.

The syringes 12 move in a rotary manner around the machine 11, remaining in the same vertical position throughout the assembly process. Inserting the plunger (see reference numeral 35) is accomplished through the use of a vertically reciprocated tube 13 that is aligned and initially positioned immediately above the barrel or reservoir of the syringe 12 (see the right-hand side of FIG. 2).

Each of the tubes 13 is vertically reciprocated by a mechanism including a vertical shaft 21 that is carried by and reciprocates relative to top section 2 and lower section 6. Shaft 21 is formed with upper guide bearings 22a, b and lower guide bearings 23a, b. In the preferred embodiment, each of the bearings 22a, b and 23a, b takes the form of a cylindrical spool, and each is disposed for alignable, guided movement by cylindrical guide bearing surfaces 24a, b formed in head section 2 and cylindrical guide bearing surfaces 25a, b formed in lower section 6. It is possible for shaft 21 to have a continuous diameter corresponding to the spool diameter over its length, but the area of reduced diameter between spools is more efficiently cleaned. It will be noted that the distance between guide bearing surfaces 24a, b is greater than the distance between the associated spools 22a, b. It is possible during the vertical reciprocating movement of shaft 21 for both of the spools 22a, b to be in guided contact with the associated bearing surfaces 24a, b (see the left-hand side of FIG. 2), or for one of the spools to be moved out of engagement with its associated guide bearing surfaces (e.g. see spool 22b and guide bearing surface 24b on the right-hand side of FIG. 2).

Spools 23a, b are similarly configured with respect to their respective guide bearing surfaces 25a, b.

Vertical shaft 21 is reciprocated by virtue of its connection to a roller bearing cam follower 27 through a step shaft 26. The cam follower 27 is disposed in a cam groove 28 formed in the stationary external cylindrical surface of central section 4. As the machine 11 rotates, central section 4 remains stationary, causing shaft 21 to move from its highest position, as shown on the right-hand side of FIG. 2, to the lowest position, shown on the left-hand side of FIG. 2. Shaft 21 returns to its highest point as the revolution is completed.

The upper end of shaft 21 is connected to a bracket member 31, the outer cantilevered end of which carries the tube 13, causing it to vertically reciprocate.

Processing machine 11 utilizes a second vertical shaft 32 that reciprocates identically to the vertical shaft 21 by virtue of its connection to the bracket 31. Vertical shaft 32 is much shorter, and it is formed with a single set of guide bearings or spools 33a, b and associated cylindrical guide bearing surfaces 34a, b. The purpose of vertical shaft 32 is to prevent rotation of the vertical shaft 21, and hence disruptive rotational movement of the tube 13, during the process of inserting the plunger 35. The spacing of the spools 33a, b and guide bearing surfaces 34a, b is the same as that of spools 22a, b and guide bearing surfaces 24a, b.

It will be appreciated that vertical downward movement of actuator shaft 21 causes a similar downward movement of tube 13 into the reservoir of syringe 12. For the reasons discussed below, the outside diameter of tube 13 is slightly less than the inside diameter of the reservoir of syringe 12.

As indicated above, the purpose of apparatus 11 is to insert a compressible plunger 35 into the reservoir of each syringe 12 where it can serve to compressibly force liquid from the syringe 12. To accomplish this, a plunger 35 is placed at the top end of tube 13 in a conventional manner, such as by a star wheel feeding mechanism (not shown). The outer diameter of plunger 35 is slightly greater than the inside diameter of the reservoir of syringe 12 and even greater than the inside diameter of tube 13. However, plunger 35 is resilient and compressible, being formed from a material such as an elastomer, and therefore is capable of being forced down through tube 13 and out of its lower end into the reservoir of syringe 12. The position of plunger 35 is determined by the distance tube 13 enters syringe 12, which in turn is determined as a function of the volume of liquid placed in syringe 12. In other words, the liquid that is filled into the syringe reservoir is sealed by plunger 35.

Plunger 35 is forced into tube 13 by a small vertically reciprocating actuator rod 36 which, like tube 13, is carried at the cantilevered end of a bracket 37. As shown in the left-hand side of FIG. 2, bracket 37 is mounted at the top end of long and short vertically reciprocating actuator shafts 38, 39 that correspond in structure to the vertical actuator shafts 21, 32. Long actuator shaft 38 includes spaced upper guide bearings or spools 40a, b and lower spaced guide bearings or spools 41a, b. These spools respectively move in cylindrical guide bearing surfaces 42a, b and 43a, b. Vertical actuator shaft 38 is reciprocated by the motion of a cam follower 44 carried on a stub shaft 45 and which rides in a cam groove 46 in central section 4.

Short actuator shaft 39 includes guide bearing spools 47a, b that respectively move in guide bearings surfaces 48a, b.

FIG. 1 shows the relative relationship of brackets 31, 37, the inner ends of which are disposed in side-by-side rotation, and the outer ends of which overlap at a common point and move colinearly.

Figure 4:
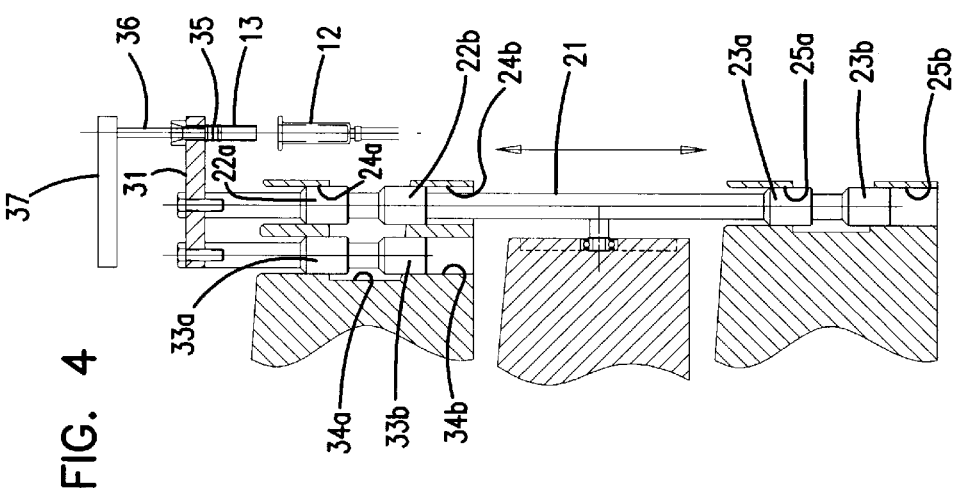
FIG. 4 is a sectional view similar to FIG. 3 with the actuator in an intermediate position.
Figure 5:
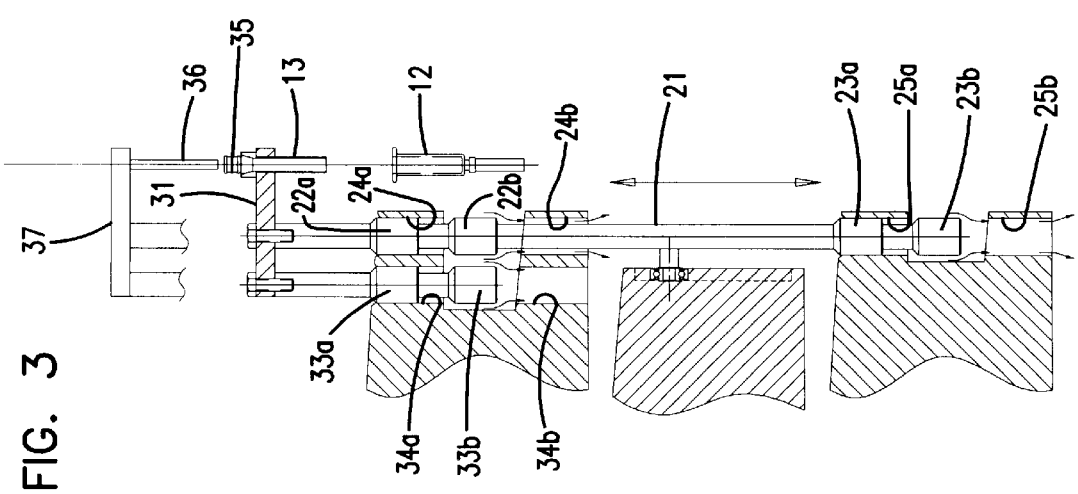
FIG. 5 is a sectional view similar to FIG. 3 with the actuator in a second extended position.

FIGS. 3–5 disclose the sequence of operation in inserting a plunger 35 into the barrel of one of the syringes 12. FIG. 3 generally corresponds to the right side of FIG. 2, showing the plunger 35 placed at the top of tube 13. FIG. 4 shows that both brackets 31, 37 have moved vertically downward by corresponding downward vertical movement of the two long actuator shafts 21, 38. In this position, the actuator rod 36 has engaged the plunger 35 moving it into tube 13, and tube 13 simultaneously has moved downward toward syringe 12.

In FIG. 5, further downward movement of bracket 31 causes tube 13 to enter syringe 12 with its lower end at a predetermined point within the reservoir of syringe 12. Further downward movement of bracket 37 causes the short actuator rod 36 to be fully inserted into tube 13, forcing plunger 35 through and out of the lower end of tube 13 where it expands and frictionally engages the inner surface of the syringe reservoir. Air is allowed to escape through the small gap defined between tube 13 and the syringe reservoir.

The foregoing fundamental mechanical movements that accomplish placement of the plunger 35 into the syringe 12 are conventional. However, the apparatus 11 is novel with regard to the use of spaced guide bearings and associated spaced guide bearing surfaces, which facilitate thorough cleaning and decontamination or sterilization of exposed surfaces. The cleaning procedure used for these surfaces is exemplified in FIGS. 3–5, which show only guide bearing spools 22a, b, 23a, b, 33a, b and the associated cylindrical guide bearing surfaces 24a, b, 25a, b, and 34a, b. The cleaning procedure is substantially the same with regard to the various guide bearings and guide bearing surfaces associated with long and short actuator shafts 38, 39. The cleaning procedure takes place before and/or after apparatus 11 is used.

With reference to FIG. 3, guide bearing spools 22a, 23a and 33a are all in contact with their associated guide bearing surfaces 24a, 25a and 34a. However, in this uppermost position, spools 22b, 23b and 33b have moved away from their associated guide bearing surfaces 24b, 25b and 34b. In this position, these latter spools and guide bearing surfaces can be cleaned and decontaminated or sterilized because their respective surfaces are fully exposed. Cleaning and decontamination or sterilization can be accomplished through the use of a wash such as water or another suitable washing agent, followed by a decontaminating or sterilizing agent, both of which reach the surfaces as shown by the arrows in FIG. 3.

After cleaning and decontamination or sterilization has been accomplished in this position, apparatus 11 is moved through the position shown in FIG. 4 to the position shown in FIG. 5. At this point, spools 22a, 23a and 33a have cleared their respective guide bearing surfaces 24a, 25a and 34a, and cleaning and decontamination or sterilization can be accomplished in a manner represented by the arrows.

It will be appreciated that apparatus 11 is constructed to permit cleaning and decontamination or sterilization of all exposed surfaces in an extremely simple manner without losing the precisely defined vertical reciprocating movement of the respective components and without the use of conventional sealing devices such as bellows that are difficult to clean and subject to wearing out.

The embodiment of FIGS. 1–5 makes use of guide bearings that reciprocate or move linearly relative to associated guide bearing surfaces. FIGS. 6A–8C disclose an alternative embodiment in which the inventive principle is utilized in a rotary bearing.

With reference to FIGS. 6A–6C, a rotary bearing having the general reference 51 includes an upper spool 52 and a lower spool 53 interconnected by a shaft 54. Spools 52, 53 and shaft 54 are rotatable within a generally cylindrical sleeve 55.

In the preferred embodiment, upper spool 52 is formed with four equiangularly spaced radially projecting lobes 56a–d having convex outer surfaces, and which are constructed and disposed for guided rotary movement by four radially inwardly projecting guide bearing surfaces 57a–d. Bearing surfaces 57c–d are concave and complement the convex surfaces of lobes 56a–d.

Lower spool 53 is formed with four radially outwardly projecting lobes 58a–d that slidably engage associated guide bearing surfaces 59a–d. While the guide bearing surfaces 57a–d and 59a–d are in axial alignment, lobes 56a–d are staggered relative to lobes 58a–d, and in the preferred embodiment lobes 56a–d are disposed 45° relative to the lobes 58a–d. As such, while the lobes 56a–d are out of engagement with guide bearing surfaces 57a–d as shown in FIG. 6B, lobes 58a–d are in guided sliding engagement with guide bearing surfaces 59a–d as shown in FIG. 6C.

With reference to FIGS. 7A–7C, shaft 54 and spools 52, 53 have been rotated clockwise 22.5°. In this position, lobes 56a–d of upper spool 52 are in partial guided engagement with guide bearing surfaces 57a–d (FIG. 7B), and lobes 58a–d of lower spool 53 are also in partial guided engagement with guide bearing surfaces 59a–d (FIG. 7C).

With reference to FIGS. 8A–8C, shaft 54 and spools 52, 53 are rotated an additional 22.5° (45° relative to the position shown in FIG. 6A). In this position, lobes 56a–d of spool 52 are in full guided engagement with guide bearings surfaces 57a–d. While lobes 58a–d of lower spool 53 have moved out of engagement with the associated guide bearing surfaces 59a–d.

From the standpoint of cleaning and decontamination or sterilization, the rotary bearing 51 may be thoroughly cleaned by first placing it in the position of FIGS. 6A–6C. Disinfecting liquid or a sterilizing agent is exposed to all of the external surfaces of spool 52, including lobes 56a–d, as well as the internal exposed surfaces of sleeve 55, including guide bearing surfaces 57a–d. The disinfecting liquid or sterilizing agent passes over shaft 54 and out of the recesses defined between spool 53 and sleeve 55. Following this step, shaft 54 and spools 52, 53 are rotated 45°, through the position shown in FIGS. 7A–7C and to the position of FIGS. 8A–8C. In this position, the disinfecting solution or sterilizing agent enters between the spaces defined between spool 52 and sleeve 55, passes shaft 54, and then flows through the now exposed surfaces between spool 53 and sleeve 55, including the outer surfaces of lobes 58a–d and the inner exposed surfaces of guide bearing surfaces 59a–d.

It will be appreciated from the foregoing that the inventive concept as shown in both linear reciprocating and rotating bearings functions to provide proper bearing alignment while at the same time permitting complete exposure of all moving surfaces for cleaning and decontamination or sterilization.

What is claimed:

1. A guide bearing assembly capable of being thoroughly cleaned and decontaminated or sterilized, comprising:

first stationary bearing surface means;

first movable bearing surface means movable between first and second positions that are respectively in and out of engagement with the first stationary bearing surface means, the first stationary bearing surface means providing mutual bearing support to the first movable bearing surface means with the first movable bearing surface means in its first position;

second stationary bearing surface means;

second movable bearing surface means movable between first and second positions that are respectively in and out of engagement with the second stationary bearing surface means, the second stationary bearing surface means providing mutual bearing support to the second movable bearing surface means with the second movable bearing surface means in its first position; and connection means for operably connecting the first and second movable bearing surface means so that when the first movable bearing surface means is in its first position, the second movable bearing surface means is in its second position, and when the second movable bearing surface means is in its first position the first movable bearing surface means is in its second position.

2. The bearing assembly defined by claim 1, wherein:

the connection means comprises linearly reciprocable shaft means;

the first and second movable bearing surface means comprise first and second spool members disposed on said shaft means and axially spaced thereon by a predetermined amount; and the first and second stationary bearing surface means comprise a stationary member having first and second bores formed therein, the first and second bores being constructed to respectively receive and guide the first and second spool members and being axially spaced by an amount different than the axial spacing of said first and second spools.

3. The bearing assembly defined by claim 2, wherein the axial spacing between said first and second bores is greater than the axial spacing of said first and second spools.

4. The bearing assembly defined by claim 3, wherein the first and second spools and the first and second bores are cylindrical in configuration.

5. The guide bearing assembly defined by claim 1, wherein:

the connection means comprises rotatable shaft means;

the first and second movable bearing surface means comprise first and second bearing members disposed on said shaft means, each of said first and second bearing members comprising a plurality of outwardly projecting, angularly spaced lobes defining bearing surfaces; and the first and second stationary bearing surface means comprise stationary sleeve means encircling the first and second bearing members, the sleeve means comprising a first like plurality of inwardly projecting bearing surfaces engagable by the plurality of projecting lobes of said first bearing member, and a second like plurality of inwardly projecting bearing surfaces engagable by the plurality of projecting lobes of said second bearing member; and the lobes of said first bearing member having an angular position on said shaft means different than the angular position of the lobes of said second bearing member of said shaft means.

6. The guide bearing assembly defined by claim 5, wherein the first and second bearing members each comprises a spool member, each of said plurality of lobes projecting radially outward from the associated spool member, and each of said lobes having a generally convex bearing surface.

7. The guide bearing assembly defined by claim 6, wherein said sleeve means defines a generally cylindrical axial bore in which said shaft means and spool members are disposed, said bearing members projecting radially inward and each having a generally concave bearing surface complementing the convex bearing surface of the associated lobe.

8. The guide bearing assembly defined by claim 7, wherein each of said spool members comprises four equiangularly spaced lobes, and the lobes of the first spool member are angularly disposed on said shaft means about 45° relative to the lobes of the second spool member.

9. A guide bearing assembly capable of being thoroughly cleaned and decontaminated or sterilized, comprising:

first guiding bearing surface means;

first guided bearing surface means;

first means for causing relative movement between the first guiding and guided bearing surface means so that in a first relative position, the first guided bearing surface means engages and is guided by the first guiding bearing surface means, and in a second relative position, the first guiding and guided bearing surface means are disengaged;

second guiding bearing surface means;

second guided bearing surface means;

second means for causing relative movement between the second guiding and guided bearing surface means so that in a first relative position, the second guided bearing surface means engages and is guided by the second guiding bearing surface means, and in a second relative position, the second guiding and guided bearing surface means are disengaged; and connection means for the first and second guiding and guided bearing surface means constructed and arranged so that when the first guiding and guided bearing surface means are in their first relative position, the second guiding and guided bearing surface means are in their second relative position, and when the second guiding and guided bearing surface means are in their first relative position, the first guiding and guided bearing surface means are in their second relative position.

10. The guide bearing assembly defined by claim 9, wherein the first and second guiding bearing surface means are stationary and the first and second guided bearing surface means are movable.

* * * * *